United States Patent
Tatsuno

(10) Patent No.: US 8,146,486 B2
(45) Date of Patent: Apr. 3, 2012

(54) DRIPPER

(75) Inventor: Isamu Tatsuno, Osaka (JP)

(73) Assignee: Mont-Bell Co., Ltd., Osaka (JP)

( * ) Notice: Subject to any disclaimer, the term of this patent is extended or adjusted under 35 U.S.C. 154(b) by 985 days.

(21) Appl. No.: 12/081,817

(22) Filed: Apr. 22, 2008

(65) Prior Publication Data

US 2009/0260521 A1 Oct. 22, 2009

(51) Int. Cl.
*A47J 31/00* (2006.01)

(52) U.S. Cl. ............. 99/322; 99/321; 99/317; 99/306; 99/304; 383/33; 383/104; 383/19; 248/331.2; 248/315.94; 220/9.4; 220/9.1; 141/88; 141/364; 222/189.07

(58) Field of Classification Search ............ 99/322, 99/321, 317, 306, 304; 383/33, 104, 19; 248/331.2, 315, 94; 220/9.4, 9.1; 414/88, 414/364; 222/189.07
See application file for complete search history.

(56) References Cited

U.S. PATENT DOCUMENTS

| | | | | |
|---|---|---|---|---|
| 2,279,442 A * | 4/1942 | Burns et al. | ............. | 248/311.2 |
| 2,397,902 A * | 4/1946 | McDill | ............. | 99/316 |
| 2,780,162 A * | 2/1957 | Chaplik | ............. | 99/306 |
| 2,991,907 A * | 7/1961 | Kinnison | ............. | 220/738 |
| 4,160,535 A * | 7/1979 | Wallsten | ............. | 248/94 |
| 4,248,397 A * | 2/1981 | Casper | ............. | 248/138 |
| 4,828,850 A * | 5/1989 | Davis | ............. | 426/77 |
| 4,867,993 A * | 9/1989 | Nordskog | ............. | 426/77 |
| 4,899,967 A * | 2/1990 | Johnson | ............. | 248/97 |
| 5,059,325 A * | 10/1991 | Iida | ............. | 210/474 |
| 5,176,830 A * | 1/1993 | Wiggins | ............. | 210/477 |
| 5,219,006 A * | 6/1993 | Bishop | ............. | 141/1 |
| 5,807,415 A * | 9/1998 | Leo | ............. | 55/385.3 |
| 5,842,408 A * | 12/1998 | Hatta | ............. | 99/323 |
| 6,059,964 A * | 5/2000 | Strawser, Sr. | ............. | 210/164 |
| 6,199,802 B1 * | 3/2001 | Scheibe, Sr. | ............. | 248/97 |
| 7,591,219 B2 * | 9/2009 | Saha | ............. | 99/323 |
| 7,815,372 B2 * | 10/2010 | Stanton et al. | ............. | 383/104 |
| 7,926,414 B1 * | 4/2011 | Wolcott et al. | ............. | 99/279 |
| 2008/0272259 A1 * | 11/2008 | Zavattieri et al. | ............. | 248/311.2 |

FOREIGN PATENT DOCUMENTS

| | | |
|---|---|---|
| JP | U-63-61283 | 4/1988 |
| JP | U-7-3528 | 1/1995 |
| JP | A-10-216018 | 8/1998 |
| JP | 10314032 A * | 12/1998 |
| JP | A-2008-43530 | 2/2008 |

* cited by examiner

*Primary Examiner* — Gene Kim
*Assistant Examiner* — Urszula M Cegielnik
(74) *Attorney, Agent, or Firm* — Oliff & Berridge, PLC

(57) ABSTRACT

Provided is a dripper that is light-weight and deformable into an arbitrary shape to be stored compactly and that enables coffee extraction irrespective of the existence of a filter. Provided is a dripper 1 for extracting coffee, including: a filter portion 10 that is formed from fabric with permeability and that includes an opening 11 through which coffee powder can be added and a receiving portion 12 that receives the coffee powder added through the opening 11; and a frame 50 that is made of an super-elastic alloy and can define the respective shapes of the opening 11 and the receiving portion 12 in the filter portion 10.

7 Claims, 5 Drawing Sheets

DRIPPER

BACKGROUND

1. Field of the Invention

The invention relates to a dripper for extracting coffee.

2. Description of Related Art

Various types of drippers for extracting coffee have been available. Examples of those drippers include a dripper that has a generally fan-cylinder shape (conical shape) conformed to the shape of a commercial paper filer and has its bottom opened with at least one hole. With the dripper, a paper filter is set inside that dripper; the dripper is placed on a coffee cup, a coffee server, or similar; and coffee powder is put in the paper filter and hot water is then added, leading to coffee extraction. This kind of dripper is formed of a material with rigidity, such as metal, resin, or ceramic. Therefore, the dripper is difficult to store compactly, and carrying the dripper is awkward.

Also, a dripper with another configuration has been introduced in which: a stainless steel wire is wound spirally to form a generally conical cylinder shape to configure a paper filter receiving portion; and a paper filter is set inside the receiving portion for coffee extraction. In this dripper, the spiral receiving portion is flatly collapsed to have a plate shape for storage, but has the disadvantage of heavy weight because it is made of stainless steel. Also, the paper filter and the receiving portion do not fit well with each other, compared with the above-described generally conical cylinder shape dripper. Therefore, hot water may leak directly to the inside of a coffee cup from a gap between the paper filter and the receiving portion, leading to weak coffee.

Also, a paper dipper is given as an example of a dripper that can be stored compactly and can be carried conveniently, but the paper dripper is disposable. There is demand for a reusable dripper from the viewpoint of environmental consciousness. In light of the above, a dripper has been introduced in which: a metal mesh is arranged at a bottom part of a generally fan-cylinder shape dripper; and coffee powder is directly put in the dripper and hot water is added, leading to coffee extraction. However, the dripper is difficult to store compactly, and carrying the dripper is awkward.

Moreover, a polypropylene coffee filter usable many times has been introduced in place of a conventional disposable paper filter. However, this coffee filter requires a separate dripper for supporting the coffee filter itself.

Furthermore, a filter rest for a coffee dripper has been introduced that can be carried conveniently and also fits well with a paper filter. The filter rest for the coffee dripper has a configuration in which: a tubular body composed of two receiving plates bendable along a prescribed part to form a through hole on its lower part and a filter insertion opening on its upper part is used; the tubular body is supported by a stand as appropriate; and the tubular body can be sandwiched in a plate-like case body that is bendable via a pivoted portion. The filter rest can be folded at the bendable position to be flat and carried in the flat state (see, e.g., JP10-216018 A).

However, the filter rest for a coffee dripper disclosed in JP10-216018 A can be folded to be flat for carrying, but needs to be carried while kept in the flat shape. Therefore, the filter rest requires a flat storage space. Also, the filter rest requires the use of a filter because the filter rest does not enable coffee extraction without the use of a filter such as a paper filter.

SUMMARY

The present invention was devised in light of the circumstances described above. It is an object of the invention to provide a dripper that is light-weight and deformable into an arbitrary shape to be stored compactly and that enables coffee extraction irrespective of the existence of a filter.

In order to achieve the above object, the invention provides a dripper for extracting coffee, including: a filter portion that is formed from fabric with permeability and that includes an opening through which coffee powder can be added and a receiving portion that receives the coffee powder added through the opening; and a frame that has elasticity and can define respective shapes of the opening and the receiving portion in the filter portion.

In the dripper having the above configuration, the filter portion is formed from the fabric, and the frame that can define the respective shapes of the opening and the receiving portion in the filter portion has elasticity, so the dripper can be deformed elastically into an arbitrary shape when not being used. Accordingly, the dripper can be stored compactly, and is therefore convenient to carry. When the dripper is used, when an external force applied for the elastic deformation is eliminated, tension is applied over the filter portion as the frame elastically returns to its original state (shape recovery property). As a result, the dripper can recover its original shape simply.

The dripper according to an embodiment of the invention may have a configuration in which: the opening is formed at an upper part of the filter portion; the receiving portion has a bag shape that continuously extends downward from the opening; and the frame includes an opening definition frame member that is arranged along at least a part of the opening and a receiving portion definition frame member that is arranged at at least a part of the receiving portion in a generally vertical direction. In the dripper with the above configuration, since the receiving portion definition frame member is arranged at at least a part of the receiving portion in a generally vertical direction, the receiving portion definition frame member can support (stand) the filter portion more reliably in a generally vertical direction (i.e., the direction of gravitational force). Therefore, the filter portion can be held in a shape with which coffee extraction can be conducted more easily.

The dripper having the above configuration may also have a configuration in which: the frame includes at least two frame bodies, each of which includes the opening definition frame member and the receiving portion definition frame member that are connected to each other; and at least the receiving portion definition frame member of one of the frame bodies and the receiving portion definition frame member of the other frame body are arranged at positions that are approximately 180° opposite to each other.

Also, the opening definition frame member is arranged along the generally entire circumference of the opening. With this configuration, the opening in the filter portion is kept in the shape of the opening definition frame member when coffee extraction is conducted. Therefore, the filter portion is held in a shape with which coffee extraction can be conducted more easily.

The dripper according to the invention may also have a configuration in which the frame body is formed by continuously forming the opening definition frame member and the receiving portion definition frame member.

In the dripper according to the invention, when the dripper is placed on a container that receives extracted coffee, a retaining portion that retains a supporting member that supports the filter portion, the shape of which is defined by the frame, with respect to the container may be arranged at a position where the receiving portion definition frame member in the filter portion is arranged. With this configuration, the supporting member can stably set the dripper on the container. Also, when a relatively long bar member such as a chopstick, fork, spoon, or stick, is used as the supporting member, extracted coffee can simply be received also in a container having an opening larger than that of the dripper.

The frame of the dripper according to the invention may be made of wire of a super-elastic alloy. The frame also can exert a restoring force in at least a direction for expanding the opening in the filter portion.

For the frame, a frame that has been restrained linearly and subjected to shape memory treatment may be used. A force acts in a direction in which the frame extends by using a super-elastic alloy as a material for the frame. Therefore, the shape of the filter portion can be maintained more stably.

Also, as fabric for forming the filter portion, fabric that can collect the coffee powder may be used. By forming the filter portion using that fabric, coffee powder can be prevented from passing through the filter portion, as a result of which coffee can be extracted directly with the filter portion. Therefore, for example, a paper filter or similar does not need to be used, which can reduce the burden on the environment. Also, the filter portion is made of fabric, so it can be used repeatedly, which is economical. Moreover, the filter portion can be reversed, and therefore, the surface with coffee powder on it can be exposed to the outside. Accordingly, washing can be performed easily.

The dripper according to the invention is composed of the filter portion formed from fabric with permeability and the frame that can define the shapes of the opening and the receiving portion in the filter portion, so the dripper is light-weight and can be deformed into an arbitrary shape to be stored compactly when not being used. Also, when the dripper is used, the original shape can easily be recovered only by eliminating the external force applied to deform the dripper. As a result, a dripper that can be carried conveniently and also does not require troublesome assemble work or the like can be provided.

DETAILED DESCRIPTION OF PREFERRED EMBODIMENTS

A dripper according to a preferred embodiment of the invention will be described below with reference to the attached drawings. The embodiment described below is for the purpose of describing this invention, and the invention is not limited only to this embodiment. Accordingly, this invention can be utilized in various ways unless those utilizations depart from the gist of the invention.

Figure 1:
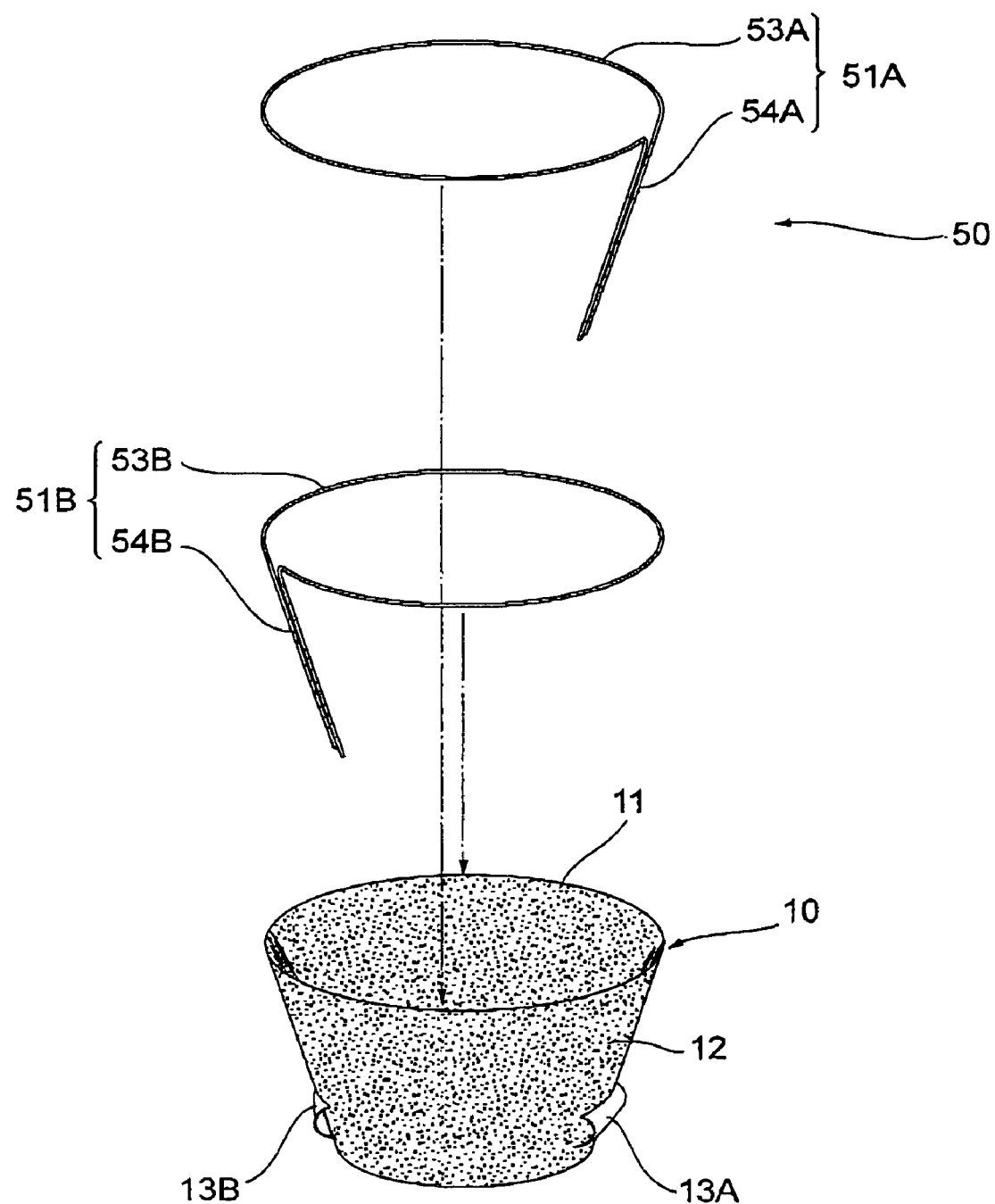
FIG. 1 is an exploded perspective view of a dripper according to an embodiment of the invention.
Figure 2:
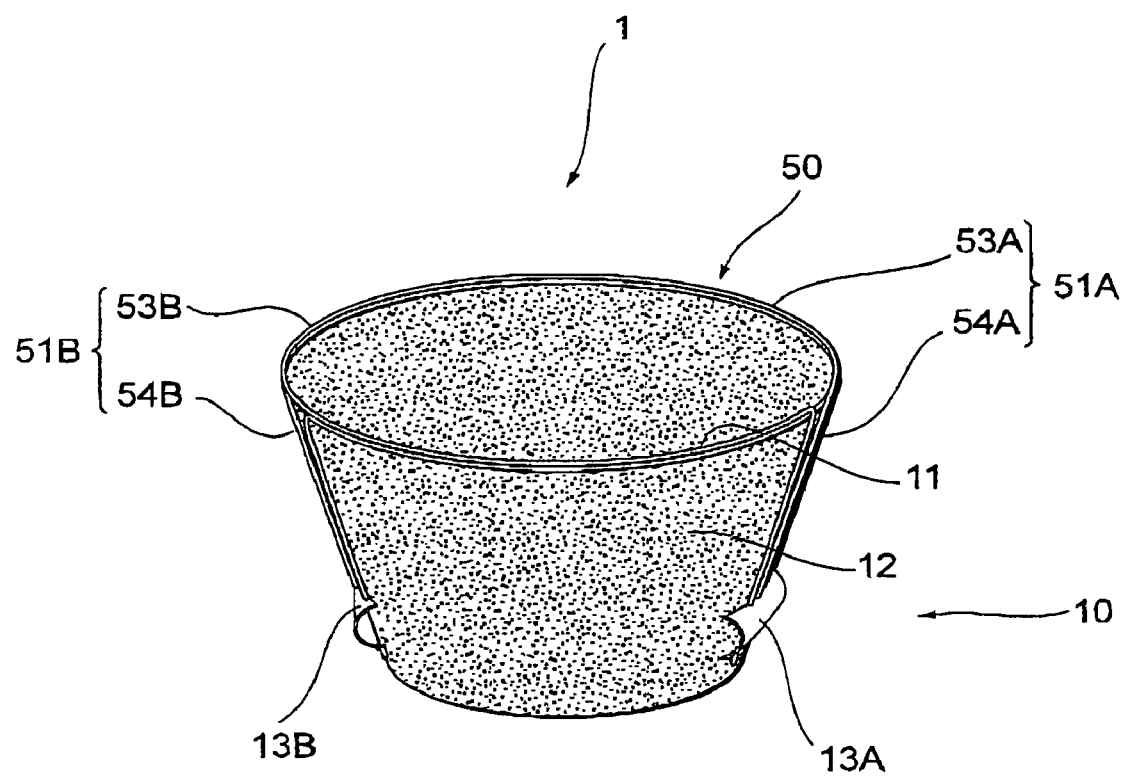
FIG. 2 is a perspective view showing an assembled state of the dripper shown in FIG. 1.
Figure 3:
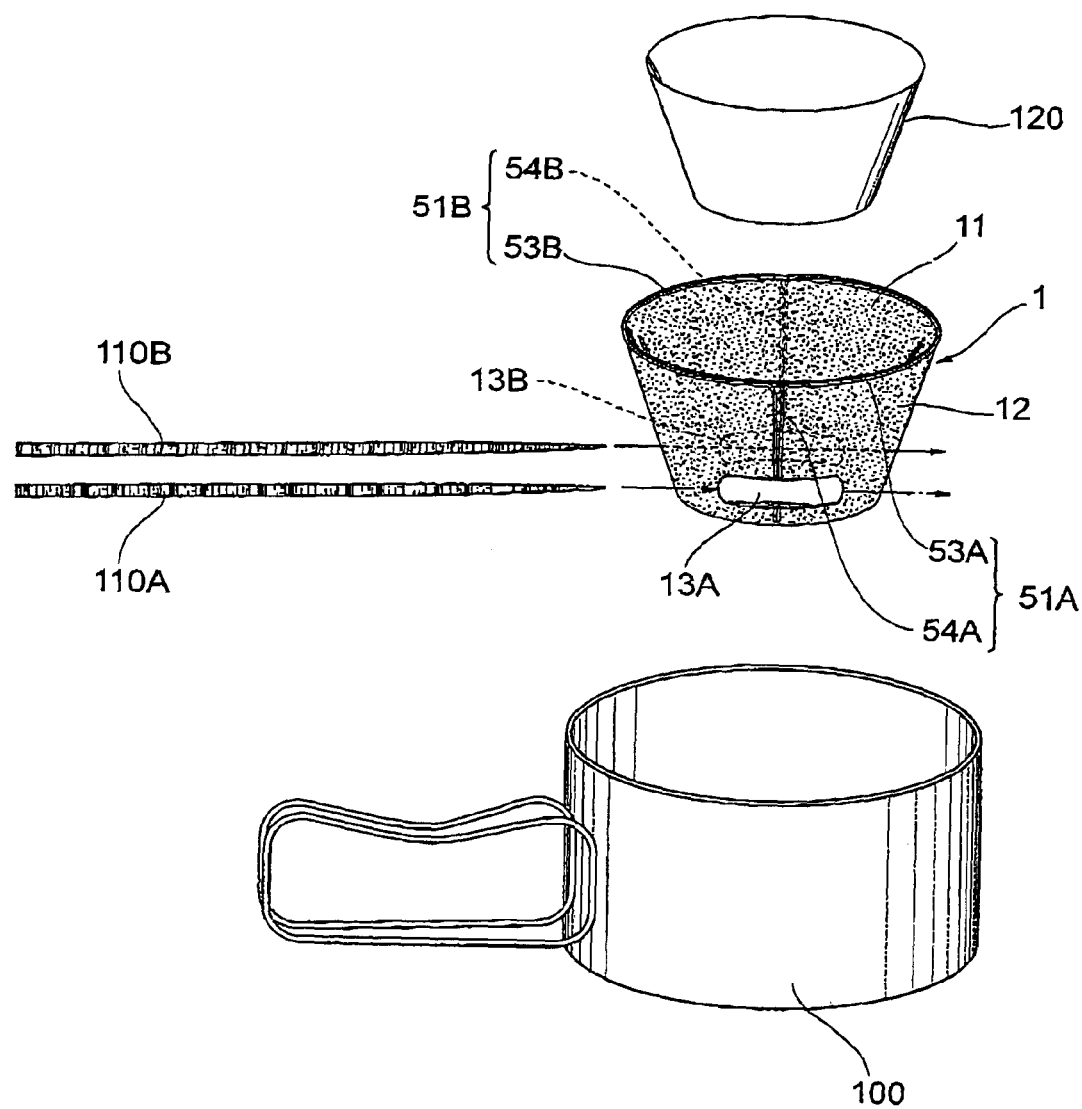
FIG. 3 is an exploded perspective view showing a method of using the dripper shown in FIG. 2.
Figure 4:
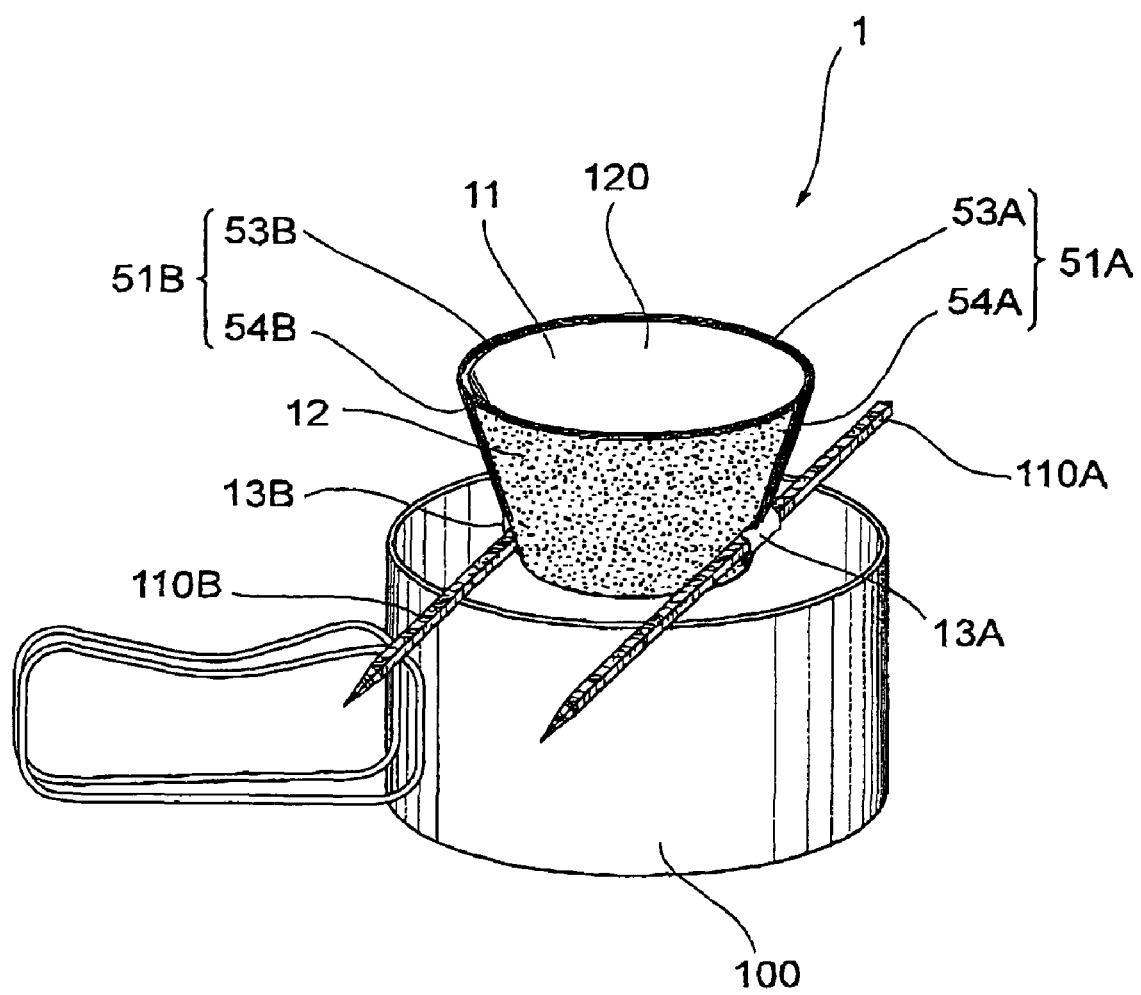
FIG. 4 is a perspective view showing a usage state of the dripper shown in FIG. 2.
Figure 5:
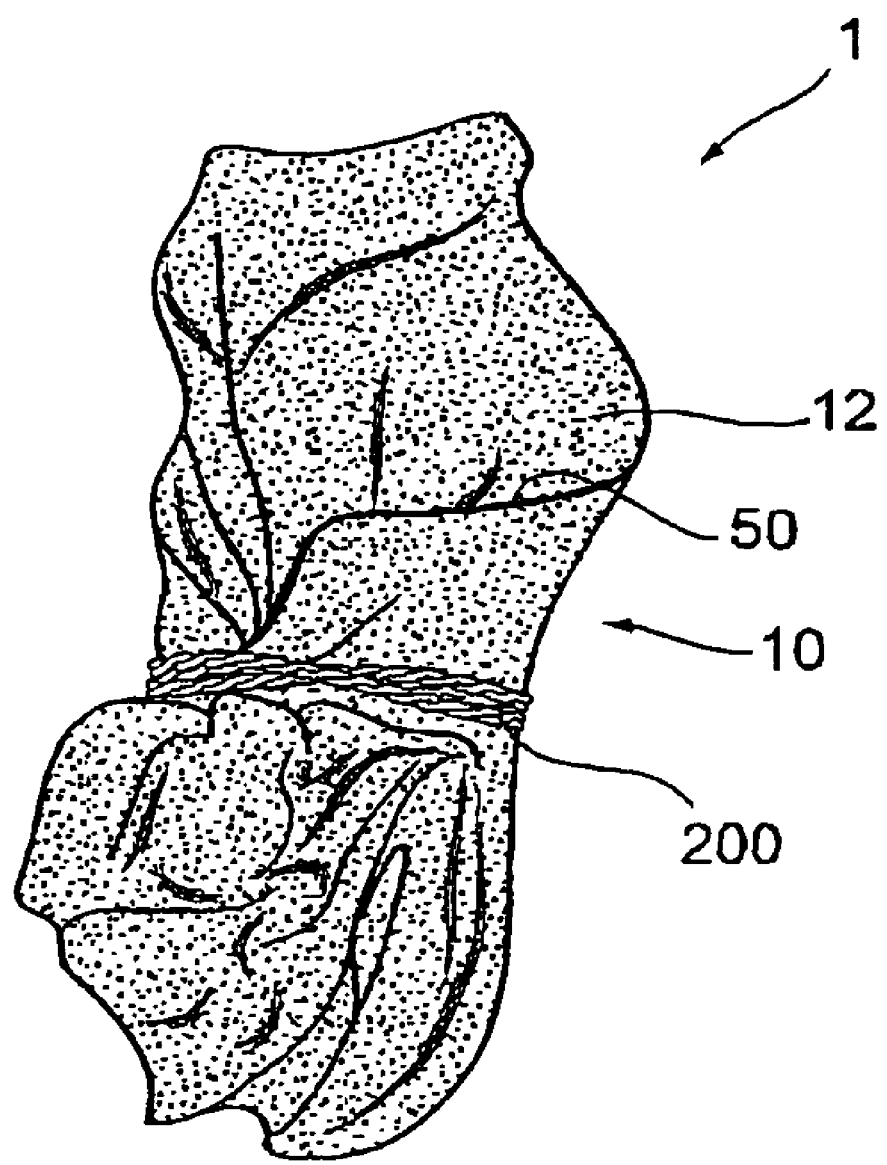
FIG. 5 is a perspective view showing a state in which the dripper shown in FIG. 2 is deformed into an arbitrary shape to be stored.

FIG. 1 is an exploded perspective view of a dripper according to the embodiment of the invention; FIG. 2 is a perspective view showing an assembled state of the dripper shown in FIG. 1; FIG. 3 is an exploded perspective view showing a method of using the dripper shown in FIG. 2; FIG. 4 is a perspective view showing a usage state of the dripper shown in FIG. 2; and FIG. 5 is a perspective view showing a state in which the dripper shown in FIG. 2 is deformed into an arbitrary shape to be stored.

As shown in FIGS. 1 to 5, a dripper 1 according to this embodiment includes; a filter portion 10 having an opening 11 through which coffee powder can be added and a receiving portion 12 that receives the coffee powder added through the opening 11; and a frame 50 that can define the respective shapes of the opening 11 and the receiving portion 12 in the filter portion 10.

The filter portion 10 is formed from fabric having water permeability, and has a shape that conforms to the shape of a commercial paper filter, i.e., a shape that has a generally fan-like side view having its upper part being wide and lower part narrower than the upper part and that is expandable into a generally triangular pyramid shape. When the filter portion 10 is expanded into a generally triangular pyramid shape, an upper edge of the filter portion 10 can define the generally circular opening 11. A bag-shaped portion continuously extending from the opening 11 forms the receiving portion 12. Note that the filter portion 10 can be formed into that shape via an arbitrary means such as suturing, adhesion, or welding.

Also, formed on an outer surface of the receiving portion 12 and at (separate) positions that are approximately 180° opposite to each other are retaining portions 13A and 13B, which respectively retain, when the filter portion 10, the shape of which is defined by the frame 50 described in detail below, is placed on a container 100 (see FIGS. 3 and 4) that receives extracted coffee, supporting members 110A and 110B for supporting the dripper 1 (filter portion 10 the shape of which is defined by the frame 50) with respect to the container 100. The retaining portions 13A and 13B each are made of a fabric having a generally rectangular shape, and have upper and lower parts sutured or bonded to the receiving portion 12 so that the supporting members 110A and 110B each define a penetrable space (through hole). Note that, in FIGS. 1 to 4, the retaining portions 13A and 13B are shown in white to make the shapes easy to be recognized; however, in this embodiment, the retaining portions 13A and 13B are formed from the same fabric as the receiving portion 12.

Any fabric may be selected for configuring the filter portion 10, so long as it is fabric that can function as a filter, such as polyester or polypropylene. Note that the filter portion 10 is made of fabric, so the dripper 1 can be used repeatedly.

Also, woven fabric or nonwoven fabric (e.g., felt) having mesh size that allows collection of coffee powder is used as the fabric for configuring the filter portion 10, as a result of which the dripper 1 itself can be used as a filter for extracting coffee. This eliminates the need to use a paper filter for the dripper 1, which is economical and also can reduce the burden on the environment. Also, when being washed after use, the filter portion 10 can be reversed because the dripper 1 is flexible, and so the surface with coffee powder on it can be exposed to the outside. Accordingly, washing can be performed easily.

Incidentally, when: the filter portion 10 is formed from fabric having water permeability and low fabric density; and coffee is extracted without using a paper filter, oil components peculiar to various kinds of coffee beans can be extracted, and therefore, rich tasting coffee can be obtained. Also, when the filter portion 10 is formed from fabric with lipophilicity, oil components of coffee beans can be removed, and therefore, refreshing tasting coffee can be extracted. This applies also to the case of a lipophilicity paper filter being set in a dripper.

The frame 50 is composed of a first frame body 51A and a second frame body 51B that are formed from wire of a super-elastic alloy and that have the same shapes, as particularly shown in FIG. 1. The super-elastic alloy wire has been restrained linearly and subjected to shape memory treatment, and exerts a force in a direction for restoring a linear shape. Note that the super-elastic alloy indicates an alloy that returns, due to the elimination of force, to its original form after being bent or stretched like rubber and that has a seemingly extremely high elasticity.

The first frame body 51A includes an opening definition frame member 53A that defines the shape of the opening 11 in the filter portion 10 and a receiving portion definition frame member 54A that defines a part of the receiving portion 12 in the filter portion 10. The opening definition frame member 53A and the receiving portion definition frame member 54A are composed of a single super-elastic alloy wire. The generally central part of the wire is defined into a generally circular ring shape to configure the opening definition frame member 53A. Both end parts of the wire are bent obliquely downward with respect to the opening definition frame member 53A and extend to come close or in contact with each other to configure the receiving portion definition frame member 54A.

Note that the second frame body 51B has the same shape as the first frame body 51A. Therefore, its explanation is omitted by replacing A in the description of the first frame body 51A with B.

The first frame body 51A and the second frame body 51B are arranged with respect to the filter portion 10, as shown in FIG. 1, so that the receiving portion definition frame member 54A and a receiving portion definition frame member 54B are superimposed over each other to be approximately 180° opposite to each other, i.e., to be arranged symmetrically. At this point, the opening definition frame member 53A and an opening definition frame member 53B are attached along with the generally entire circumference of the opening 11 in the filter portion 10, and the receiving portion definition frame members 54A and 54B are arranged at the respective positions where the retaining portions 13A and 13B in the filter portion 10 are formed in a generally vertical direction. Note that the first frame body 51A and the second frame body 51B can be arranged with respect to the filter portion 10 via various attaching means such as suturing, adhesion, and welding.

Regarding the dripper 1, normally the opening 11 in the filter portion 10 is expanded into a generally circular shape by the opening definition frame members 53A and 53B, and the receiving portion 12 in the filter portion 10 is supported by the receiving portion definition frame members 54A and 54B, so the entire filter portion 10 is maintained in a generally fan-cylinder shape, as shown in FIGS. 2 and 3. At this point, the first frame body 51A and the second frame body 51B are formed from the super-elastic alloy wire that has been restrained linearly and subjected to shape memory treatment, and are arranged symmetrically, as described above. Therefore, the first frame body 51A and the second frame body 51B exert a restoring force in a direction for expanding the opening 11 in the filter portion 10 and a restoring force in a direction for expanding the receiving portion 12 to the outside. Accordingly, the above shape of the dripper 1 is maintained stably.

For extraction of coffee using the dripper 1, for example, a commercial paper filter 120 is inserted through the opening 11 in the filter portion 10 and set in the receiving portion 12, as shown in FIG. 2; the supporting members 110A and 110B (here, chopsticks) are inserted through the retaining portions 13A and 13B; and the supporting members 110A and 110B are bridged across an upper edge of the container 100 so that the dripper 1 is placed on the container 100 as shown in FIG. 4. Then, a desired amount of desired coffee powder may be put in the paper filter 120 set in the receiving portion 12, and hot water may be added.

Incidentally, as described above, when the receiving portion 12 is formed from woven or nonwoven fabric having mesh size enabling collection of coffee powder, the paper filter 120 does not need to be used. Even when not also using the paper filter 120, the dripper 1 can simply be washed as in the above-described manner.

Also, regarding the dripper 1, the filter portion 10 is formed from fabric, and the frame 50 is a super-elastic alloy as described above, so a dripper of a size for two persons has a light weight of about 1.8 g. When the dripper 1 is stored after use, the dripper 1 can be deformed into an arbitrary shape (folded compactly or rounded), as shown in FIG. 5. In order to maintain the resultant small shape, the dripper 1 may be bound with a binding member 200 (e.g., rubber band, cord, or band). Alternatively, the dripper 1 can be put in a small bag, case, or similar, for example. Therefore, the dripper can be stored compactly, and is therefore convenient to carry.

To reuse the dripper 1, the original shape can simply be recovered only by eliminating the external force applied to deform the dripper 1 (act of binding with a rubber band, cord, band, or similar or act of putting the dripper 1 into a small bag, case, or similar). Accordingly, no troublesome assembly work is required, which is convenient.

Note that this embodiment has been described for the case where the shape of the filter portion 10 is made to conform to the shape of a generally available paper filter, but the shape is not limited to that shape. Examples of the shapes include a generally columnar bag shape, a generally conical bag shape with its lower part being narrow, a generally semi-spherical shape, and a generally square planar bag shape. The shape of the filter portion 10 is not particularly limited as long as the shape is one that enables coffee extraction.

Also, this embodiment has been described for the case where the generally rectangular shape fabrics, each of which includes upper and lower parts fixed to the receiving portion 12 so that spaces that the supporting members 110A and 110B can penetrate through are defined, are used as the retaining portions 13A and 13B for retaining the supporting members 110A and 110B for supporting the dripper 1 with respect to the container 100 when the dripper 1 is placed on the container 100. However, the retaining portions 13A and 13B are not limited to the above fabrics, and may have other configurations as long as the supporting members 110A and 110B can support the dripper 1 with respect to the container 100. Also, the number of retaining portions to be provided may be set arbitrarily, and may be three or more or only one.

Also, various items such as forks, spoons, pens, sticks, as well as chopsticks may be employed for the supporting members 110A and 110B. The retaining portions may be fixed to an edge of the container 100 by means of a clip, a clothespin, or the like.

This embodiment has been described for the case where: the frame 50 is composed of the first frame body 51A and the second frame body 51B; and the first frame body 51A (second frame body 51B) is composed of the opening definition frame member 53A (53B) arranged along with the generally entire circumference of the opening 11 in the filter portion 10 and the receiving portion definition frame member 54A (54B) arranged at the position where the retaining portion 13A (13B) in the filter portion 10 is formed in a vertical direction. However, the configuration of the frame 50 is not limited to the above configuration, and is not particularly limited as long as the frame 50 can define the shapes of the opening 11 and the receiving portion 12 in the filter portion 10. For example, the opening definition frame member 53A (53B) may be arranged along at least a part of the opening 11, and the receiving portion definition frame member 54A (54B) may be arranged along at least a part of the receiving portion 12 in a vertical direction. Also, the opening definition frame member 53A (53B) and the receiving portion definition frame member 54A (54B) do not need to be formed continuously, and may be formed separately.

Moreover, this embodiment has been described for the case where the super-elastic alloy wire, which has been restrained linearly and subjected to shape memory treatment, is used as a material for configuring the frame 50, but the material is not limited to the above wire. The frame 50 is not particularly limited as long as the frame 50 has elasticity and can define the shapes of the opening 11 and the receiving portion 12 in the filter portion 10. Therefore, for example, a configuration may be employed in which: the circumference of the opening 11 is formed into a bag shape by, e.g., folding the circumference; and the bag formed along the circumference is inflated with air, etc.

Note that the dripper according to the invention is basically used for extracting coffee, but may obviously be used for extracting other beverages such as tea, Japanese tea, and Chinese tea, and also may be used for applications other than beverage extraction.

What is claimed is:

1. A dripper for extracting coffee, comprising: a filter portion that is formed from fabric with permeability and that includes an opening through which coffee powder can be added and a receiving portion that receives the coffee powder added through the opening; and a frame that has elasticity and can define the shapes of the opening and the receiving portion in the filter portion, wherein the opening is formed at an upper part of the filter portion, the receiving portion has a bag shape that extends continuously downward from the opening, and the frame includes an opening definition frame member that is arranged along at least part of the opening and a receiving portion definition frame member that is arranged along at least a part of the receiving portion in a direction that extends from the opening portion toward a bottom of the receiving portion wherein the frame includes at least two frame bodies, each of which includes the opening definition frame member and the receiving portion definition frame member that are connected to each other; and at least the receiving portion definition frame member of one of the frame bodies and the receiving portion definition frame member of the other frame body are arranged at positions that are approximately 180° opposite to each other, wherein when placing the filter portion, the shape of which is defined by the frame, on a container that receives extracted coffee, a retaining portion, which retains a supporting member that supports the filter portion with respect to the container, is arranged at a position where the receiving portion definition frame member in the filter portion is arranged.

2. The dripper according to claim 1, wherein the opening definition frame member is arranged along the generally entire circumference of the opening.

3. The dripper according to claim 1, wherein the frame body is formed by continuously forming the opening definition frame member and the receiving portion definition frame member.

4. The dripper according to claim 1, wherein the frame is made of a super-elastic alloy.

5. The dripper according to claim 1, wherein the frame exerts a restoring force in at least a direction for expanding the opening in the filter portion.

6. The dripper according to claim 1, wherein the frame is formed by being restrained linearly and being subjected to shape memory treatment.

7. The dripper according to claim 1, wherein the fabric can collect the coffee powder.

* * * * *